R. L. COLTER.
PHOTOGRAPHIC CAMERA.
APPLICATION FILED APR. 26, 1918.
1,366,876.
Patented Jan. 25, 1921.
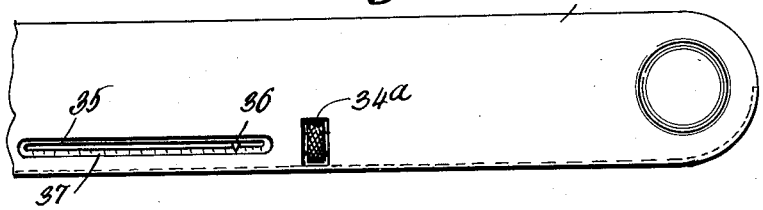
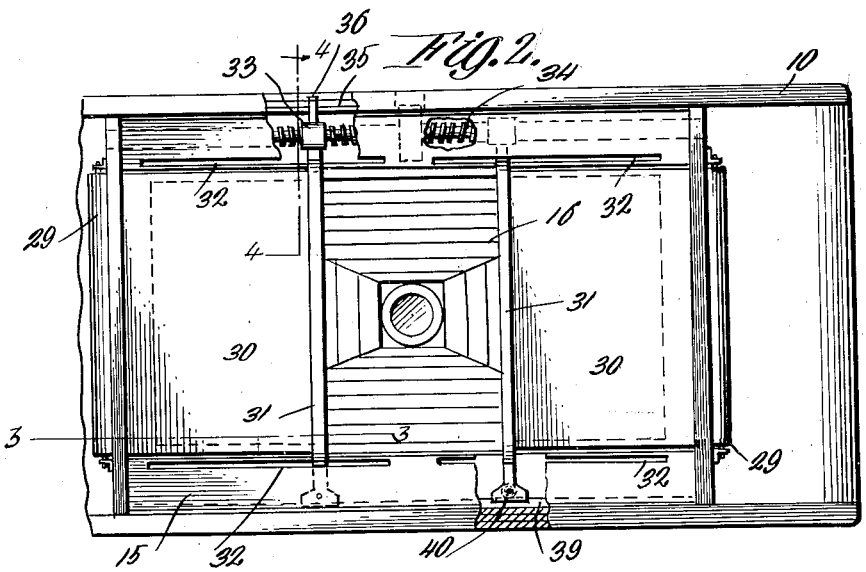
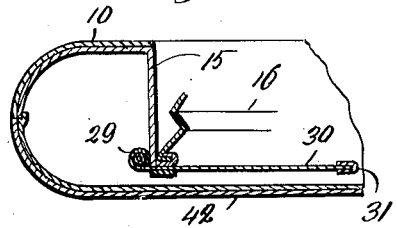
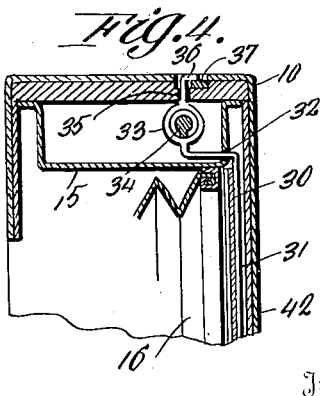
WITNESSES
Guy M. Spring
V. B. Hillyard
Inventor
ROBERT L. COLTER
By Richard B. Owen
Attorney

UNITED STATES PATENT OFFICE.

ROBERT L. COLTER, OF LAKELAND, FLORIDA.

PHOTOGRAPHIC CAMERA.

1,366,876.  Specification of Letters Patent.  Patented Jan. 25, 1921.

Application filed April 26, 1918. Serial No. 230,938.

*To all whom it may concern:*

Be it known that I, ROBERT L. COLTER, a citizen of the United States, residing at Lakeland, in the county of Polk and State of Florida, have invented certain new and useful Improvements in Photographic Cameras, of which the following is a specification.

This invention relates to photographic cameras or holders for sensitized material, and has for its primary object to provide a camera to which films of various sizes are adapted.

A further object of the invention is to provide a camera of the character mentioned which is equipped with means for enlarging or reducing the size of the focal area within the camera, whereby large or small pictures may be taken upon the sensitized film within the camera.

A still further object of the invention is to provide improved means for holding the focal area closures in adjusted position.

With these objects in view, together with others which will appear as the description proceeds, the invention resides in the novel formation, combination, and arrangement of parts, all as will be described more fully hereinafter, illustrated in the drawings, and particularly pointed out in the claims.

In the drawings:—

Figure 1 is a top plan view of a camera constructed in accordance with the invention, an end portion being broken away, Fig. 2 is a rear elevation, parts in section, of the camera with the cover member removed, Fig. 3 is a fragmentary sectional view taken substantially upon line 3—3 of Fig. 2, Fig. 4 is a transverse fragmentary sectional view taken substantially upon line 4—4 of Fig. 2.

Referring now more particularly to the drawings, the invention is shown as applied to a well known form of roll holding camera embodying the casing 10. Within the casing is the frame 15 having the usual exposure opening. To the edges of this frame is attached the rear portion of the bellows 16; the device as a whole constituting the camera.

Rotatably mounted within the camera casing and adjacent the ends thereof are spring rollers 29, each of which is of a length substantially equal to the width of the focal area of the camera, and each roller has secured thereto one end of an opaque screen or shade 30. The rollers 29 may be mounted in any suitable manner within the camera casing, and are adapted, when the ends of the shades or screens 30 are released, to wind the latter upon themselves, thereby withdrawing the shades from within the focal area of the camera. It will be observed by referring particularly to Figs. 3 and 4 of the drawings that the shades or screens 30 are disposed a short distance in front of the film passing from one end to the other of the camera. The free end of each shade 30 has secured thereto a strip or bar 31, the ends of which are bent forwardly at right angles and each of the said angularly disposed portions extends through a slot 32 in the interior frame 15 of the camera. The body portion of the strips or bars 31 may be crimped or in any other preferred manner secured to the free end of the curtains 30. The extremities of the angularly bent portions of each of the bars 31 at the upper ends thereof are provided with upwardly extending socket members or sleeves 33, having internal threads to be engaged by the threads on the rotatable shaft 34. This shaft is suitably journaled at its ends in the camera frame and is disposed longitudinally thereof immediately below the top plate. It is to be observed that the said shaft has oppositely inclined threads thereon, which accommodate respectively the sleeves at the curtain ends. The shaft is provided intermediate its ends with a knurled nut 34ª, the latter protruding at one side to be rotated by the fingers of the operator. It is obvious from this construction that rotary movement applied to the shaft 34 will cause the curtains 30 to move into or out of the focal area of the camera, depending upon the direction of rotation of the said shaft. The camera top near one end is provided with a longitudinally disposed slot 35, through which protrudes an indicator finger 36 carried by the sleeve 33 adjacent the said slot. The camera at the edges of the slot may be graduated as shown so that the operator may judge the distance between the curtains 30 in adjusting the latter. The scale or graduations in the present instance are on the strip or plate 37. The inner face of the bottom plate of the camera is provided with a longitudinally disposed track 39. This track supports rollers 40 rotatably carried by the lower ends of the bars 31, and maintains the said bars in proper position when the latter move longitudinally thereon.

The removable back for the camera is indicated at 42, and is of conventional form, being secured in proper position by any preferred means.

While the present is a disclosure of what is believed to be the preferred embodiment of the invention, it is to be understood that the invention is not limited thereto, but that various changes in the minor details of construction, proportion, and arrangement of parts may be resorted to if desired without departing from the spirit of the invention as defined by the appended claims.

I claim:—

1. A camera casing for film rolls having an exposure field in its front, laterally movable curtains to control the exposure field, means at the ends of the curtains coacting with the casing to give proper support to the curtains and direct them in their movements when adjusting the exposure field, a shaft paralleling the exposure field and disposed at one side thereof and having its end portions oppositely threaded and connecting means between the edges of the respective curtains and the threaded end portions of the said shaft.

2. A camera casing for film rolls having an exposure field in its front, an inner frame having portions adjacent the open front and above and below the opening therein and formed with longitudinal slots, laterally movable curtains to control the exposure field, reinforcing members at the free ends of the curtains and having their ends offset and extending through the said longitudinal slots of the frame, and means for imparting a simultaneous and uniform movement to the curtains in opposite directions to maintain the edges of the curtains equidistant from the axis of the lens.

3. A camera casing for film rolls having an exposure field in its front, an inner frame having portions adjacent the open front and above and below the opening therein and formed with longitudinal slots, laterally movable curtains, bars at the ends of the curtains having their ends bent and operating in the said longitudinal slots and means for imparting a simultaneous and uniform movement to the curtains in opposite directions to maintain the edges of the curtains equidistant from the axis of the lens.

4. A camera casing for film rolls having an exposure field in its front, an inner frame having portions adjacent the open front and above and below the opening therein and formed with longitudinal slots, laterally movable curtains to control the exposure field, reinforcing bars at the free ends of the curtains having their ends offset and extending through the said longitudinal slots, a longitudinal shaft at one side of the exposure field and paralleling the curtains and having its end portions oppositely threaded and sleeves at the ends of the said reinforcing bars having screw-thread engagement with the respective end portions of the shaft.

5. A camera casing for film rolls having an exposure field in its front, and having a longitudinal slot in its top and scale graduations adjacent the slot, laterally movable curtains to control the exposure field, means at the ends of the curtains coacting with the casing to give proper support to the curtains and direct them in the movements when adjusting the exposure field, means for imparting a simultaneous lateral movement to the curtains in opposite directions and an indicating element movable with one of the curtains and passing through the said slot and acting with the graduations at one side thereof to designate the adjustment of the exposure field.

6. A camera casing for film rolls having an exposure field in its front, an inner frame having longitudinal slots in portions above and below the exposure field, laterally movable curtains to control the exposure field, bars at the ends of the curtains having their end portions offset and extending through the longitudinal slots, a track below the exposure field, rollers at the lower ends of the bars mounted to travel upon said track, sleeves at the upper ends of the said bars, and a shaft disposed above the exposure field and having its end portions oppositely threaded and engaging the sleeves of the respective bars.

In testimony whereof I affix my signature in presence of two witnesses.

ROBERT L. COLTER.

Witnesses:
L. KAUFMAN,
P. W. ZANIER.